United States Patent
De Haan

(10) Patent No.: US 7,319,813 B2
(45) Date of Patent: Jan. 15, 2008

(54) METHOD AND APPARATUS FOR RECORDING A DIGITAL INFORMATION SIGNAL

(75) Inventor: Wiebe De Haan, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1155 days.

(21) Appl. No.: 10/259,714

(22) Filed: Sep. 27, 2002

(65) Prior Publication Data

US 2003/0068159 A1    Apr. 10, 2003

(30) Foreign Application Priority Data

Oct. 2, 2001    (EP) .................................. 01203727

(51) Int. Cl.
*H04N 5/00*    (2006.01)

(52) U.S. Cl. ......................... 386/125; 386/95; 386/126

(58) Field of Classification Search ................. 386/95, 386/125, 126
See application file for complete search history.

(56) References Cited

U.S. PATENT DOCUMENTS 6,078,727 A * 6/2000 Saeki et al. ................. 386/125

FOREIGN PATENT DOCUMENTS

| EP | 0390268 A2 | 10/1990 |
|---|---|---|
| WO | WO0101416 | 1/2001 |

* cited by examiner

*Primary Examiner*—Thai Q. Tran
*Assistant Examiner*—Daniel Tekle

(57) ABSTRACT

Method of contiguously recording a sequence of ordered A/V information signals, such as video/audio information, and corresponding management information signals, such as video management, menu information or file information, on a disc-like recording medium of the write-once type, such as an optically recordable and readable disc. The recorded information complies to the requirements of ordering of such information as defined by a disc of the read-only type or of the rewritable type. The method comprises allocating a reserved area within a linear addressing space of the disc, contiguously recording the A/V information signals in a video recording area located succeeding the reserved area, recording corresponding management data in a temporary overview space succeeding the video recording area, generating a mapping table for mapping the recorded management data to address locations in the reserved area and recording the mapping table in the temporary overview space. When finalizing the disc, the recorded management information signals is copied to the reserved area in correspondence to the latest mapping table information and the remaining unrecorded sections of the reserved area is recorded with arbitrary data signals.

22 Claims, 11 Drawing Sheets

METHOD AND APPARATUS FOR RECORDING A DIGITAL INFORMATION SIGNAL

FIELD OF THE INVENTION

The invention relates to a method of contiguously recording a sequence of ordered A/V information signals, such as video/audio information, and corresponding management information signals, such as video management, menu information or file information, on a disc-like recording medium of the write-once type, such as an optically recordable and readable disc, the recorded information complying to the requirements of ordering of such information as defined by a disc of the read-only type or of the rewritable type.

The invention also relates to a recording device for contiguously recording a sequence of ordered A/V information signals, such as video/audio information, and corresponding management information signals, such as video management, menu information or file information, the recorded information complying to the requirements of ordering of such information as defined by a disc of the read-only type or of the rewritable type, the recording devive comprising means for carrying and rotating a disc-like recording medium of the write-once type, such as an optically recordable and readable disc, means for scanning a focused laser beams across a track of the disc-like recording medium,means for modulating the laser beam in accordance with digital information signals to be recorded on the disc-like recording medium, means for detecting reflections of the laser beam scanning the disc-like recording medium and converting the reflection in digital information signals to be read, means for modulating received digital A/V information signals to information signals to be recorded and control means for controlling the recording and reading of the digital information signal.

BACKGROUND OF THE INVENTION

A similar method and device are known from for example the International Patent Application Application WO 01/01416-A1 (PHN 17522), although the device and method disclosed therein are related to discs of the rewritable type only.

The disclosed video recording format (DVD-Video Format) disclosed therein was originally designed for storing audio-visual content on disc of the read-only type, such as a replicated disc (DVD-ROM/Video). Also disclosed in the referred applicaition is a variation of the DVD-Video Format, the DVD-+RW Video Format, suitable for storing video in real time on rewritable discs (DVD+RW) in a playback compatible way.

However, for cost-reasons and for archiving purposes, users might prefer recordable (or write-once) media to rewritable media. The DVD+RW Video Format could be used but it has the disadvantage that certain management information and menu structures need to be recorded in advance of the actual video content. Without this management information in this location, the disc is not compatible with DVD-ROM/Video or DVD+RW players.

However, on a recordable disc, such information can only be stored once, so no multiple recordings or updates of recordings can be made without accepting restrictions to compatibility.

OBJECT AND SUMMARY OF THE INVENTION

In consequence, amongst other things, it is an object of the invention to obviate the above-mentioned disadvantage. According to one aspect a method according to the inventions is characterized by allocating a reserved area within a linear addressing space, contiguously recording the A/V information signals in a video recording area located succeeding the reserved area, recording corresponding management data in a temporary overview space succeeding the video recording area, generating a mapping table for mapping the recorded management data to address locations in the reserved area and recording the mapping table in the temporary overview space.

Further according to one of its aspects a recording device according to the inventions is characterized in that, the control means are adapted to allocate a reserved area within a linear addressing space on the disc-like recording medium, to contiguously record record the A/V information signals in a video recording area located succeeding the reserved area, to record corresponding management data in a temporary overview space succeeding the video recording area, to generate a mapping table for mapping the recorded management data to address locations in the reserved area, to record the mapping table in the temporary overview space.

The invention is based on the concept of a virtual management area which is being mapped to the real physical location by a mapping table. Only when finalizing a disc, that is providing the disc with a Lead-In and a Lead-Out area to make the disc playback compatible, the management data structures are copied to the correct location in the reserved area.

A further advantageous embodiment of the method according to the invention is characterized by contiguously recording a next sequence of A/V information signals on a next video recording area succeeding the previously recorded areas, recording next corresponding management data in the next temporary overview space succeeding the next video recording area, generating a mapping table for mapping the first and the next recorded management data to address locations in the reserved area and recording the mapping table in the next temporary overview space.

This has the advantage of recording multiple sequence of A/V information to the disc.

A next advantageous embodiment of the method according to the invention is characterized by generating updated corresponding management information signals, recording at least the updated management information signals in a next temporary overview area succeeding the previous temporary overview area, generating an updated mapping table for mapping the updated management data and the remaining management data to address locations in the reserved area and recording the updated mapping table in the next temporary overview space.

This allows updating of the management data in case a recorded A/V stream is edited only.

A following advantageous embodiment of the method according to the invention is characterized by copying the recorded management information signals to the reserved area in correspondence to the latest mapping table information, recording the remaining unrecorded sections of the reserved area with arbitrary data signals, recording a lead-in area preceding the reserved area with data according to the definitions of a disc of the read-only type or of the rewritable type, recording a lead-out area succeeding the recorded area with data according to the definitions of a disc of the read-only type or of the rewritable type or with closure data for closing an actual video recording session.

The recording of the management data in a manner such that playback compatibility is obtained can now be done in a simple straightforward manner.

BRIEF DESCRIPTION OF THE DRAWINGS

These and other aspects and advantages of the present invention will be clarified in more detail with reference to the disclosure of preferred embodiments, and in particular with reference to the appended Figures that show.

DESCRIPTION OF THE EMBODIMENTS

Figure 1:
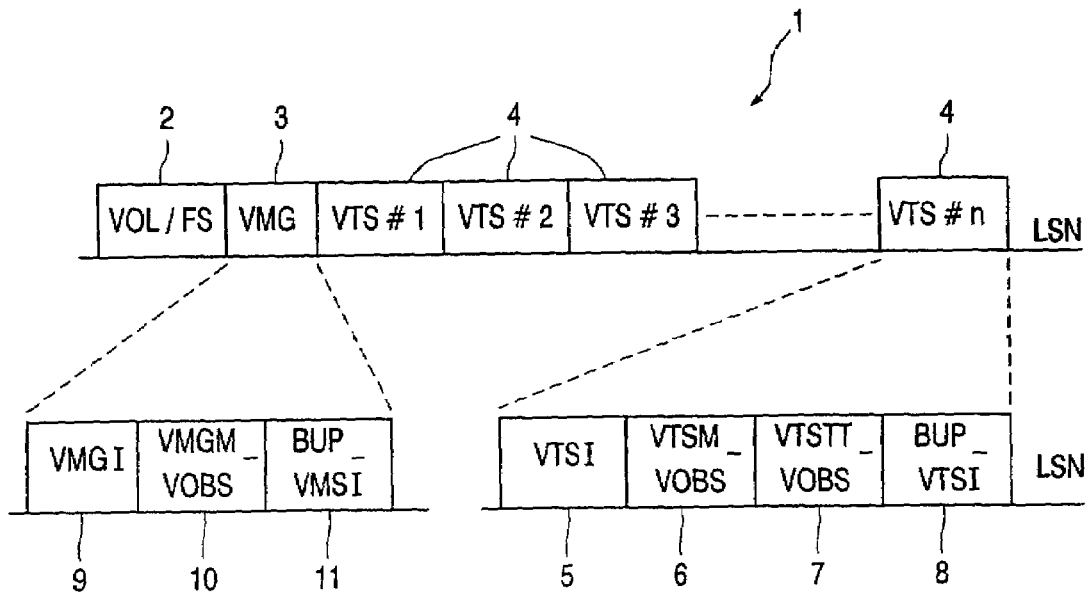
FIG. 1 the DVD-Video data structure on a DVD disc of the Read-Only type.

FIG. 1 shows the video data structure 1 on an optically readable disc of the DVD-Read Only type. The sequence of data is arranged from left to right in order of increasing logical sector numbers (LSN), a sector being the smallest unit of addressing data stored on a DVD disc. Typically one sector corresponds to 2048 user data bytes. For clarity reasons additional disc zones such as a Lead-in zone and a Lead-out zone are not shown.

The video data structure 1 comprises a Volume and File System (VOL/FS) data t 2, Video Manager (VMG) data 3, several Video Title Sets (VTS#1, VTS#2, VTS#3, VTS#n) 4-7.

Volume and File System 2 data defines the DVD Video Volume space according to the Universal Disc Format UDF. The video data in one Volume is composed of one Video Manager (VMG) 3 and one or more Video Title Sets (VTS) 4. The file system data enables addressing data objects in the so-called DVD Video zone comprising the Video Manager (VMG) data 3 and the Video Title Sets 4 (VTS). Adapting the data object in this DVD Video Zone may require adapting of the file system data also.

A Video Title Set (VTS#n) 4 is a unit describing a complete video content or Title. It is composed of VTS Information (VTSI#n) to control the Title and the Menu in the Video Title Set (VTS#n) 4, the Video Object Set for the Menu (VTSM_VOBS) 6, the Video Object Set for the Title (VTSTT_VOBS) 7 and a backup of the VTSI (BUP_VTSI) 8. A Video Object Set (VOBS) is a collection of Video Objects (VOB). A VOB being an MPEG Program stream made up of a group of Elementary streams, such a Video, Audio, Sub-picture, Program Control Information (PCI) and Data Search Information (DSI). The VTSI 5, VTSM_VOBS 6, VTSTT_VOBS 7 and VTSI_BUP 8 shall be allocated in this order. Files comprising VTSTT_VOBS 6 shall be allocated contiguously.

The Video Manager 3 comprises the Video Manager Information (VMGI) 9, the Video Object Set for the VMG Menu (VMGM_VOBS) 10 and the backup of the VMGI (VMGI_BUP) 11.

Figure 2:
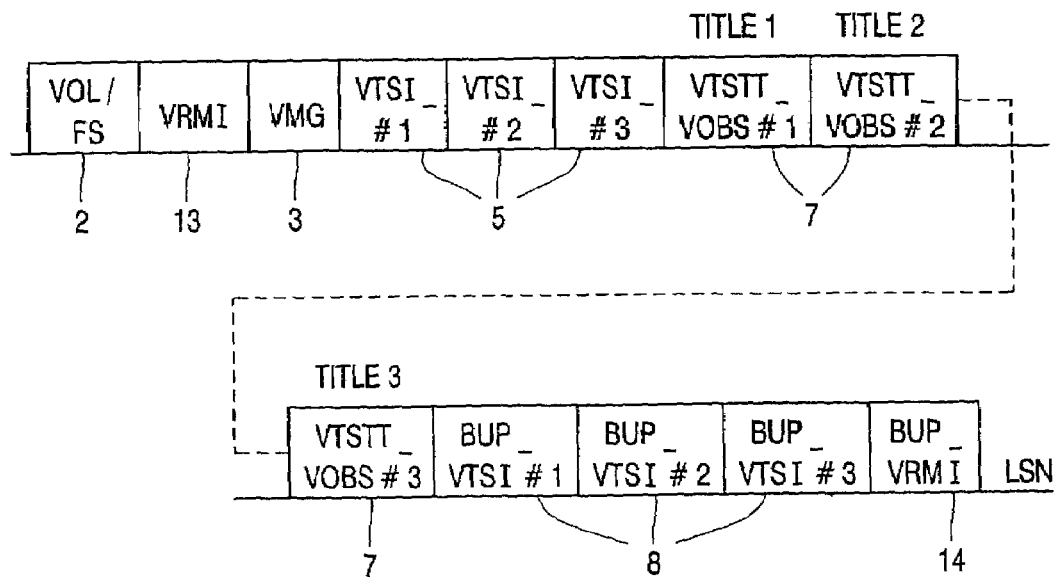
FIG. 2 a DVD-Video data structure on a DVD disc of the Rewritable type.

FIG. 2 shows a DVD-Video data structure 12 on a DVD disc of the Rewritable type, specifically according to the DVD+RW type, using same reference numbers as in FIG. 1 to indicate equivalent parts. The shown DVD-Video data structure 12 is according to a method and recording device as disclosed in the International Patent Application WO 01/01416-A1 (PHN 17522), which is incorporated by reference herewith. In order to maintain playback compatibility with existing DVD-players intended for DVD discs of the Read-only type, the restrictions of the corresponding Video data structures 1 on these discs should be taken into account, especially when several recording are made.

In FIG. 2 an example is given showing three recordings (TITLES) represented by the Video Object Set for the Title (VTSTT_VOBS#1, VTSTT_VOBS#2, VTSTT_VOBS#3) 7 and the corresponding Video Title Set Information (VTSI#1, VTSI#2, VTSI#3) 5. Typically of the referred method is the order of these data, the VTS management information VTSI 5 always preceding the Video Object Sets VTSTT_VOBS 7 and the backup data VTSI_BUP 8 always succeeding. This sequence of data can be viewed as one Video Object Title Set (VTSTT_VOBS), meeting the restrictions of the DVD-Video data structure 1 of the DVD-Video disc of the Read Only type.

Additional to these data, Video Recording Management Information data (VRMI) 13 and a corresponding backup VRMI_BUP 14 are present. It includes the information to identify which type of recorder has generated the DVD/Video menus on the disc. Not shown is other typically recorder information data such as Video Recording Management Scratch Area (VRM Scratch) which may be used by recorders to temporally store data and a VRM User Data area which may be used to add additional performance on some recorders. This data will be neighboring the VRMI data 13.

Figure 3A:
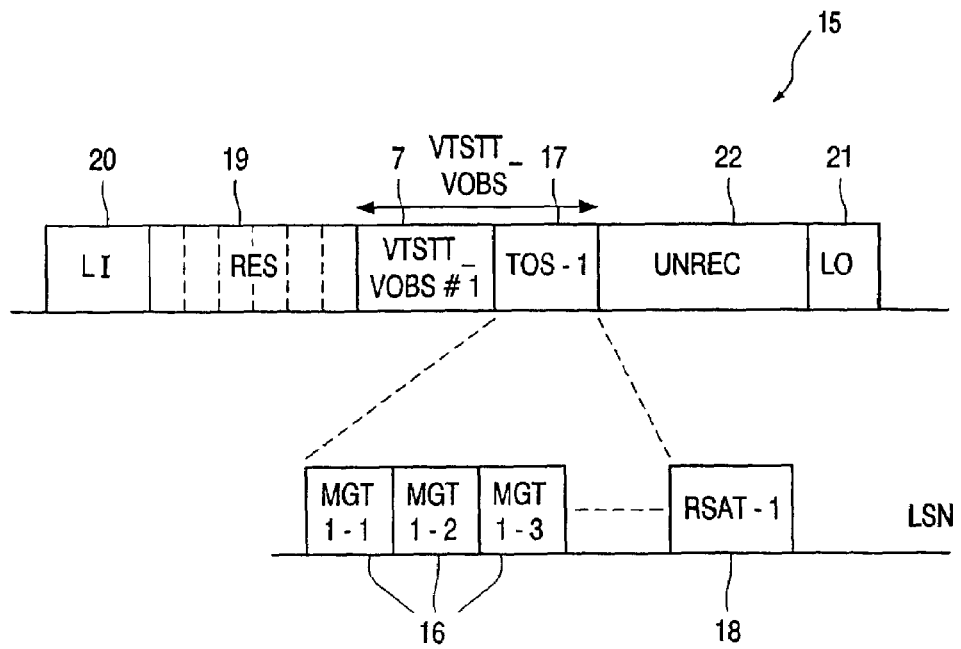
FIGS. 3A-3D a DVD-Video data structure on a DVD disc of the Recordable type, according to the invention.

FIG. 3A illustrates a first example of a DVD Video data structure 15 for a DVD disc of the Recordable Type (record once) after a first recording according to a first embodiment of the invention. This first recording is represented by the VTSTT_VOBS#1 and the corresponding file and management information which is stored in Management Data Areas (MGT1-1, MGT1-2, MGT1-3) 16. These areas comprise the VTSI#1, VMG, VRMI, and File System Information such as UDF. In addition the back-up file of the VTSI, the VRMI and a second ADVP are recorded contiguously in this order.

The ADVP represents the Anchor Volume Descriptor Pointer that is required by the UDF file system. The ADVP is always stored on a fixed location to enable a computer system to recognize that the data is stored in the UDF format. The ADVP gives the location of a logical volume descriptor sequence (LVDS) which contains a series of data structures regarding the structure and location of data stored on the disc. This includes references to one or more file set descriptors FSD. The ADVP can thus be regarded as the start of the (UDF) file system. A second ADVP is a backup of a this (first) ADVP.

But for explaining the invention it is not necessary to indicate the type of management data but only the occupied areas. The Temporary Overview Space 17 contains all management information and file information required by the DVD/Video data structure for the DVD disc of the rewritable type as disclosed in the above-mentioned patent application.

The Management Data Areas (MGT) 16 is however not recorded in front of the VTSTT_VOBS 7, as normally required by the DVD Video Data structures for the DVD disc of the Read-Only or the Rewritable Type, but is recorded after the VTSTT_VOBS 7 of the first recording in a Temporary Overview Space (TOS) 17. This Temporary Overview Space (TOS) 17 includes a Reserved Space Allocation Table (RSAT) 18 containing a mapping of the Management Data Areas (MGT) to locations in the Reserved Space (RES) 19 in front of the VTTT_VOBS. The Reserved Space 19 is not used for recording until the last recording has been made and a disc finalization step is being performed. The finalization step including copying all Management Data Areas 16 to this Reserved Space 19 using the mapping in the Reserved Space Allocation Table 18. Only after such a finalization step, playback compatibility with DVD Players intended for DVD Video discs of the Read-Only type or the Rewritable Type is being obtained. This will be explained in more detail hereafter.

The Reserved Space 19 starts after the Lead-In Area (LI) 20 and ends at Logical Sector Number R. At a typical DVD disc the first Physical Sector after the Lead-Area 20 is assigned 0003 0000h (h: hexa-decimal) and increases to the start of the Lead-Out Area (LO) 21 to a value of for instance 00026 0540h. This corresponds to a total of 2 295 104 (d: decimal) Physical Sectors where a Physical Sector contains 2048 user data bytes.

However, all Physical Sectors are mapped for addressing purposes to Logical Sectors with a Logical Sector Numbering (LSN). The start of the recording space after the end of the Lead-In Area 20 is indicated by Logical Sector Number 0000 0000h and increases to the start of the Lead-Out area 21 until Logical Sector Number 0022 FF40h.

The Reserved Space 19 is arranged form Logical Sector Number 0000 0000h (or Physical Sector Number 0003 0000h) to Logical Sector Number 0000 3FFF h (or Physical Sector Number 0003 3FFFh), corresponding to approximately 32 Mbyte. This value is chosen in view of the DVD Video Data structure for the a DVD disc of a rewritable type. However, the Reserved Space 19 may be chosen any size. Further, multiple reserved areas are also possible.

Mapping may be applied on the basis of Error Correction Blocks (ECC-Blocks). A typical DCD ECC block may comprise 16 Physical Sectors in addition to error correction data. Within an ECC block, data is recorded at the actual location in the same order as it would haven been without at the intended location.

Additional recordings should be made in the Unrecorded Area (UNREC) after the Temporary Overview Space 17. As long as the recordable DVD disc has not been finalized, also being indicated by the presence of an open session, the Reserved Space 19 shall not be recorded.

Figure 3B:
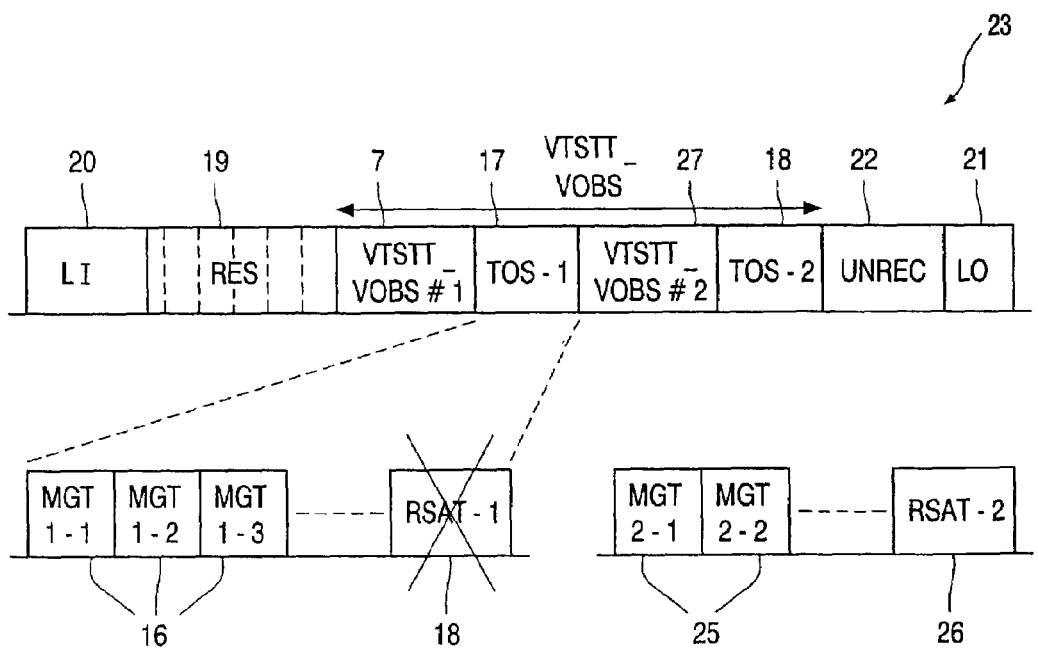

Next, FIG. 3B shows a Video Data structure 23 according to an embodiment of the invention, after a second recording has been made. Same reference numbers indicate corresponding structures in FIG. 3A. The second recording, represented by VTSTT_VOBS#2 27, is appended to the first Temporary Overview Space 17. The corresponding Management Data (MGT2-1, MGT2-2) 25 and a second Reserved Allocation Space Table (RSAT-2) 26 is appended to the second recording. This RSAT-2 contain not only the mapping of the Management Data 25 of the second recording, but also the mapping of the Management Data 16 of the first recording. The Reserved Allocation Space Table RSAT-1 will therefore not being used anymore. As will be explained hereafter, a Reserved Space Allocation Table comprises a version number, to indicate which version is obsolete.

As a result, the VTSTT-VOBS#17, the TOS-1 17, the VTSTT_VOBS#2 and the TOS_2 can be regarded as continuous VTSTT_VOBS. The sequence may contain sectors in a format not known to DVD Video Players, but as long they are not referenced by any Program Chain, they do not disturb the correct operation of the players.

A Program Chain is used in the DVD Video data structures for a DVD disc of the Read-Only type, to indicate part of or the entire Title or Menu. It defines the Cells to be presented, a Cell being the basic unit to be presented. A Cell consists of a number of Video Object Units (VOBU) and forms part of a VOB.

Figure 3C:
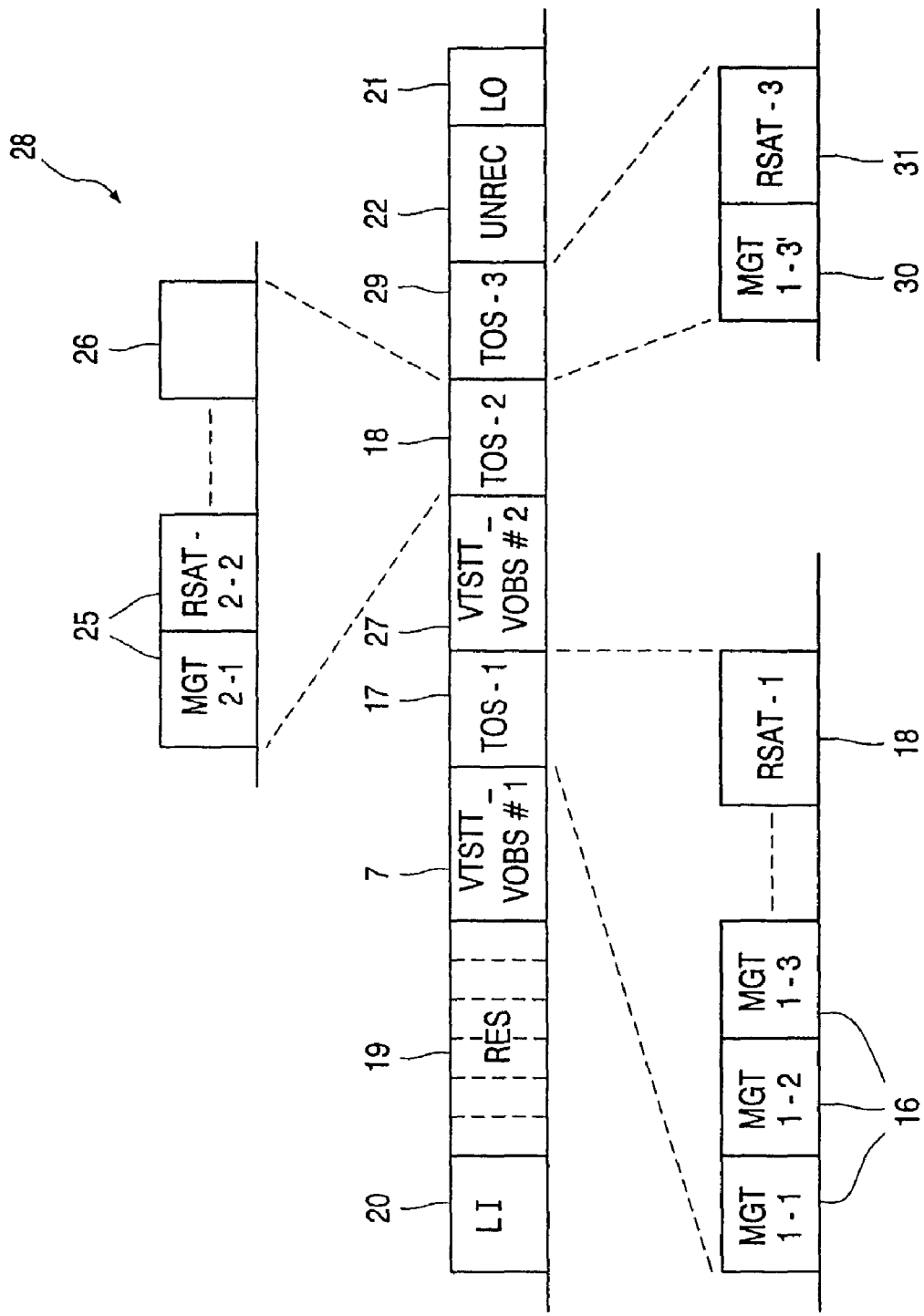

Next, FIG. 3C shows a Video Data Structure 28 according to an embodiment of the invention, after an update is being made to the management information without necessitating to make chances to the corresponding VTSTT_VOBS. For instance, a user may edit a recording, resulting in only a change in the VRMI 13. A new menu page may also be needed. Then there may be no need for changing the VTSTT_VOBS 7 or 27.

The update only effects part of the Management Data (MGT1-1, MGT1-2, MGT1-3) of the first recording as only MGT1-3 thereof is obsolete. The new version of MGT-3 referred to as MGT1-3' is recorded in a new Temporary Overview Space (TOS-3) 29 appended to the previous Temporary Overview Space (TOS-2) 18. TOS-3 contains MGT1-3' and a new Reserved Allocation Space Table (RSAT-3) 31 containing the updated mapping corrected for MGT1-3 (now obsolete) and MGT1-3'(replacement). The previous Reserved Allocation Space Table (RSAT-2) 26 has become obsolete by this, indicated by having TOS-3 the highest version number.

Figure 3D:
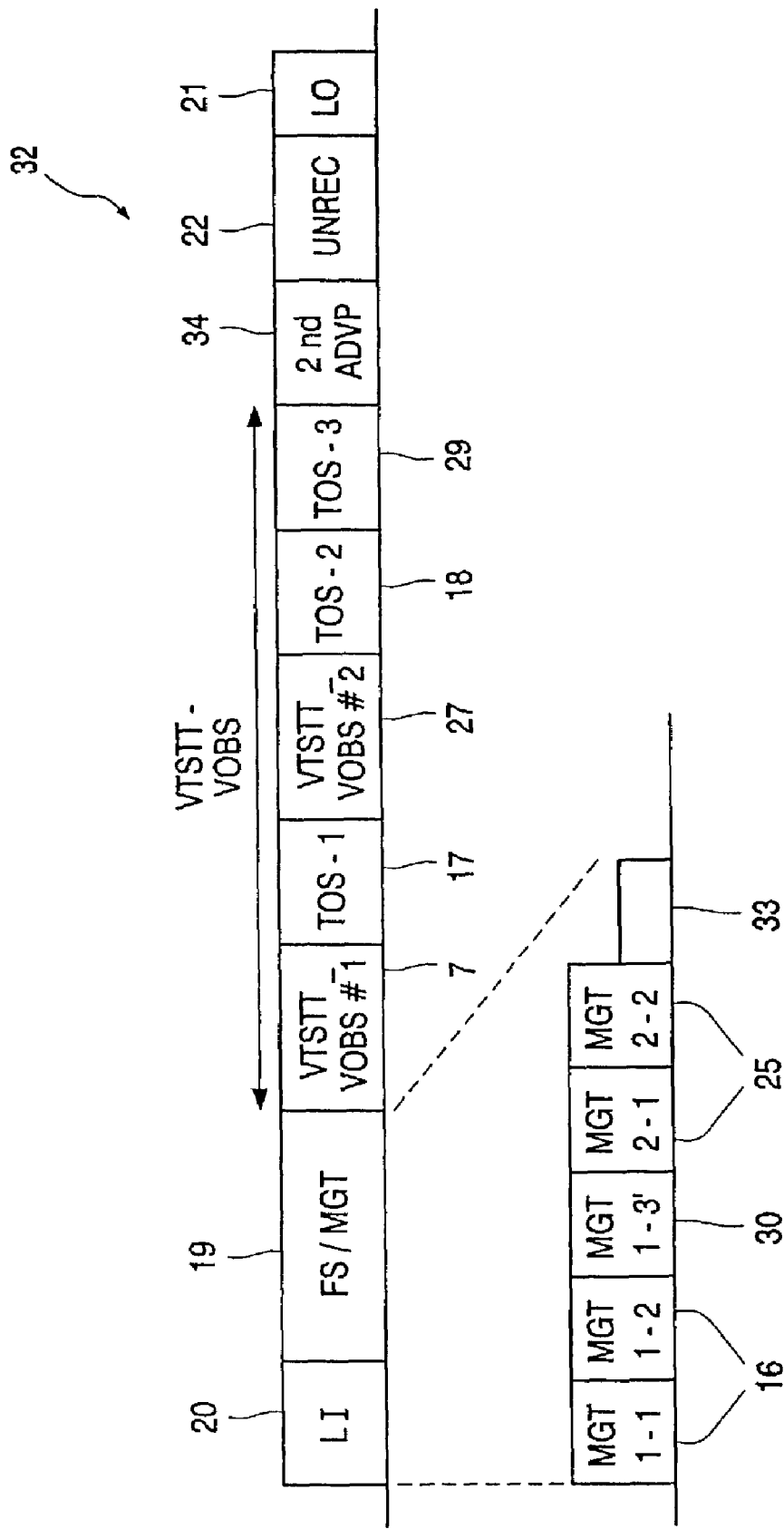

Next, FIG. 3D shows a Video Data structure 32 according to an embodiment of the invention, after a finalizing step is being performed. All Data Management Data (MGT1-1, MGT1-2, MGT1-3', MGT2-1, MGT 2-2) 16, 30, 25 is copied to the Reserved Space 19, comprising also file system data such as UDF. In the remaining space 33 in the Reserved Space that is not occupied by the Management Data 16, 30, 25 arbitrary data is recorded. Also the Lead-In area 20 and Lead-Out area 21 are being recorded.

It is remarked that the back-up files (VRMI-BUP, VTSI_BUP) 14, 8 are included in the last Temporary Overview space (TOS-3) 29 and are not being remapped. Including of such files in the Temporary Overview space increases robustness. Also after the last VRMI_BUP, a second Anchor Volume Descriptor Pointer (ADVP) 34 should be present, as requested by the UDF file system.

Figure 4:
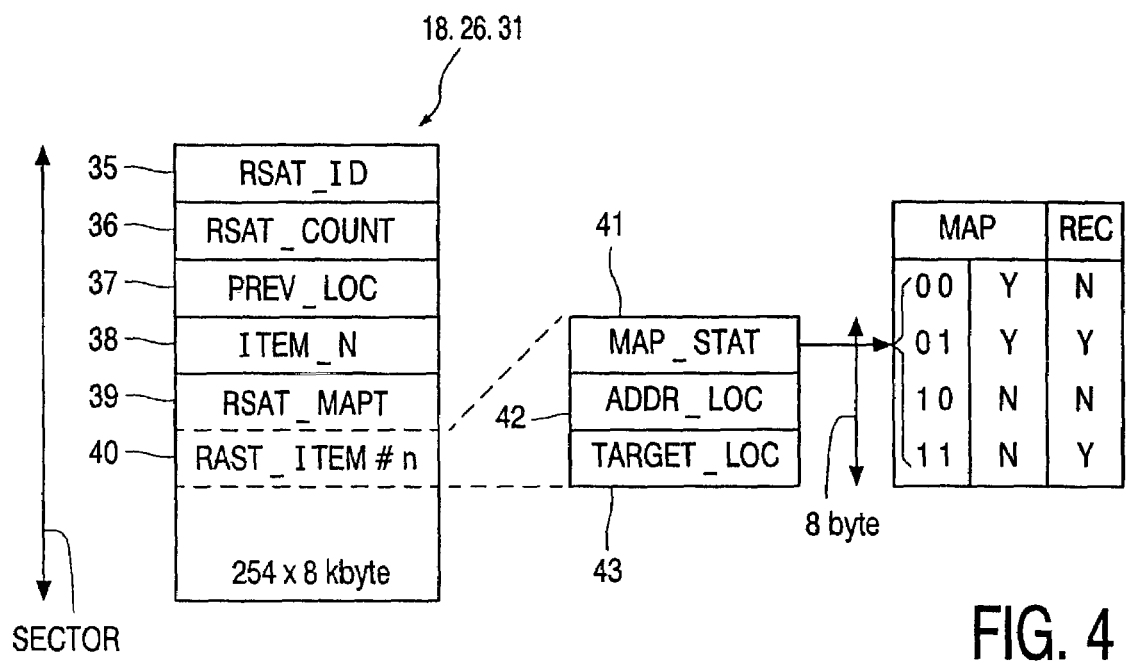
FIG. 4 a Reserved Allocation Table according to a first embodiment of the invention.

FIG. 4 shows a first embodiment of a Reserved Space Allocation Table (RSAT) 18, 26, 31 comprising maximal 1 Logical Sector (2048 bytes).

The RSAT_ID 35 (4 bytes) contains a string containing "RSAT".

The RSAT_COUNT 36 (1 byte) contains a decimal number indicating the version number of the Reserved Space Allocation Table (18, 26, 31). The first time an RSAT is recorded, this field is set to 0. For each new version of RSAT the value of this field is incremented by one.

The PREV_LOC (3 bytes) 37 contains the Logical Sector Number (LSN) of the location where the previous RSAT can be found.

The ITEM_N (1 byte) 38 indicates the number of used RSAT_ITEMS in the RSAT Mapping Table (RSAT_MAPT)

The RSAT_MAPT (2032 bytes) 39 contains 254 RSAT_ITEMS (8 bytes) 40 of 8 bytes each. Used RSAT_ITEMS 39 are placed before any unused RAST_ITEMS 39. All bytes of unused RSAT_ITEMS 39 are set to 0. The used RSAT_ITEMS 39 divide the recording area of a DVD disc, between the LI and the LO, into ITEM_N mapping segments, each consisting of a consecutive sequence of logical sectors. The mapping segments are linearly mapped on to target segments of the same size.

A RSAT_ITEM 40 contains a MAP_STAT 41 (2 bits) indicating the mapping status for the segment starting at ADDR_LOC 42 of this item and ending just before ADDR_LOC 42 of the next item. If there is no next item, the mapping status remains the same for all following logical sector numbers until the last written sector.

Possible values of MAP_STT 41 are given in the table within FIG. 4. 00b (binary) indicates that the corresponding segment is not recorded and that addresses locations are mapped to new target locations. 01b indicates the segment is reserved for a recorded segment with address locations mapped to new target locations. 10b indicates that a segment is not recorded and that target locations are identical to addressed locations. 11b indicates that the segment is recorded and the target locations are identical to the addressed locations.

ADDR_LOC 42 (3 bytes) contains the Logical Sector Number (LSN) of the first sector of the mapping segment, such as an ECC-block comprising 16 Physical Sectors. In that case the ADDR_LOC 42 shall be a multiple of 16. The RSAT_ITEMS 40 are increasing such that ADDR_LOC 42 is increasing.

TARGET_LOC (3 bytes) contains the Logical Sector Number (LSN) of the first sector of the target segment. The sector at ADRR_LOC+n is mapped onto the sector at TARGET_LOC +n with n in the range from 0 to ADDR_LOC (current)−ADDR_LOC (current)−1

Figure 5:
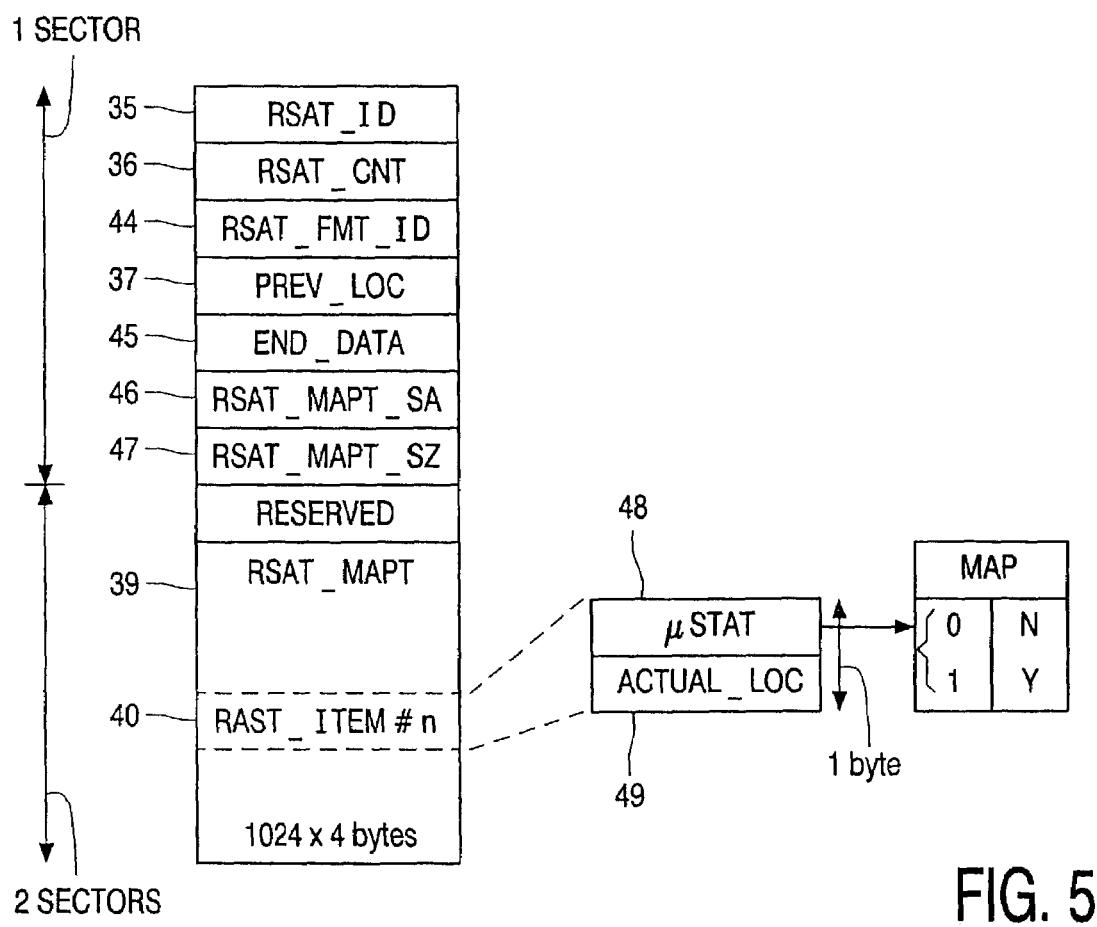
FIG. 5 a Reserved Allocation Table according to a second embodiment according to the invention.

FIG. 5 shows an alternative embodiment of Reserved Space Allocation Table (18, 26, 31) comprising 3 Logical Sectors. Where appropriate similar reference numbers as in FIG. 4 are being used. Similar are a RSAT_ID (4 bytes) 35 and a RSAT_COUNT (2 bytes) 36.

New is the RSAT_FMT_ID 44 (1 byte) for indicating the RSAT format mode as used by an application.

A PREV_LOC (3 bytes) 37 is again similar.

New is the END-DATA (3 bytes) 45 which contains the Logical Sector Number (LSN) of the last sector containing application data that is not intended to allocated in the Reserved Space 19. When RSAT_FMT_ID 44 is set to 1, END_DATA 45 indicates the location of the second Anchor Volume Descriptor Pointer ADVP 34 of an UDF file system.

RSAT_MAPT_SA (2 bytes) 46 contains the start address of the RSAT_MAPT 39 in bytes relative to the start address of RSAT.

RSAT_MAPT_SZ (2 bytes) 47 contains the size of RSAT MAPT in bytes.

The RSAT_MAPT (2 sectors) 39 contains 1024 RSAT_ITEMS (4 bytes) 40. RSAT_ITEM#n contains the mapping information for the (n+1)st ECC block in the Reserved Space 19.

MSTAT (1 bit) 48 indicates the mapping status for the (n+1) st ECC block in the Reserved Space 19. 0b (b: binary) indicates that this ECC block is in use and 1b indicates that this ECC block is mapped to another location. If MSTAT equals 0b, no data is recorded for logical sectors in the range from LSN=(n×16) to LSN=((n×16)+15).

If MSTAT equals 1b, data recorded for logical sectors in the range from LSN=(n×16) to LSN=((n×16)+15) can be found at locations indicated by ACTUAL_LOC (3 bytes) 49.

ACTUAL_LOC 49 then contains the LSN of the first sector of the ECC-block where the data is actually recorded. The value recorde in ACTUAL_LOC 49 shall be a multiple of 16. (The three least significant bits of ACTUAL_LOC 49 shall always be set to 000b. If MSTAT 48 equals 0b, the value recorded in ACTUAL_LOC 49 shall be 000000h FIG. 5 shows a first example of possible use of a Reserved Space Allocation Table (RSAT) 18, 26, 31 in Video applications. Illustrated are the recording space 51 according to a 'real' disc and the recording space 52 according to a 'virtual' disc to be obtain by mapping the 'real' disc. In this example the 'real' disc have not been finalized, so the management information (VRMI 13, VMG 3, VTSI 5), the back-up therefrom (VTSI_BUP 8 and VRMI_BUP 14) and file information (UDF 52) are recorded after the last recorded VTSTT_VOBS 7 (corresponding to the earlier mentioned Management Data (MGT) 16.

Further shown are the MAP_STAT 48 and the Logical Sector Number LSN for each area. The recording space 51 corresponds to the Reserved Space 19 and reflects a "virtual' disc obtained by mapping the 'real' disc. The area between LSN=k and LSN=B should be recorded with arbitrary data after finalization.

The corresponding table in FIG. 5 shows corresponding values of MAP_STAT 41, addressed location (ADDRESSED) and actual location (ACTUAL). MAP STAT 41=00b indicates mapped and not recorded, 10b indicates not mapped and not recorded and 11b indicates not mapped but recorded.

Figure 6:
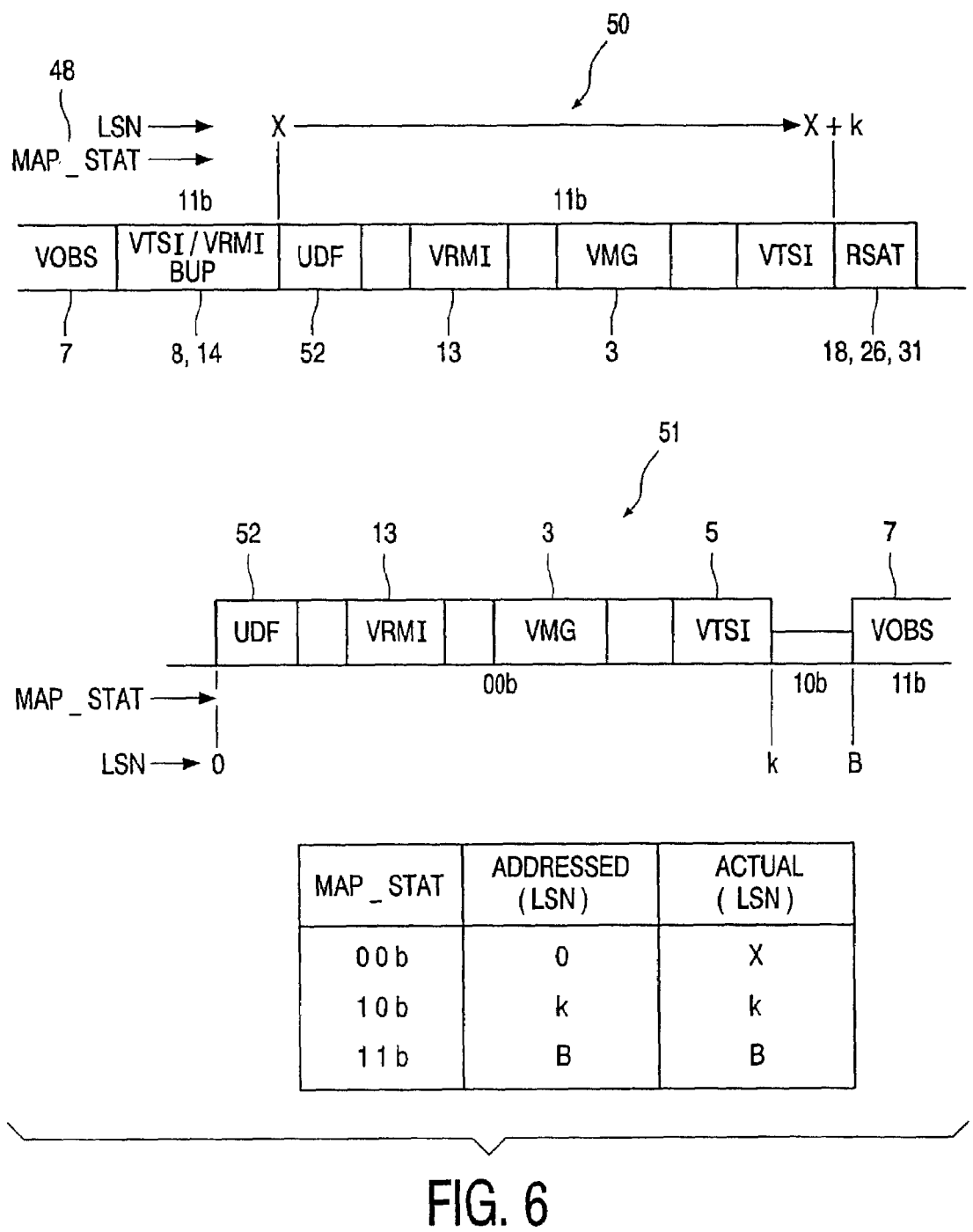
FIG. 6 a first example of use of a Reserved Allocation Table.
Figure 7:
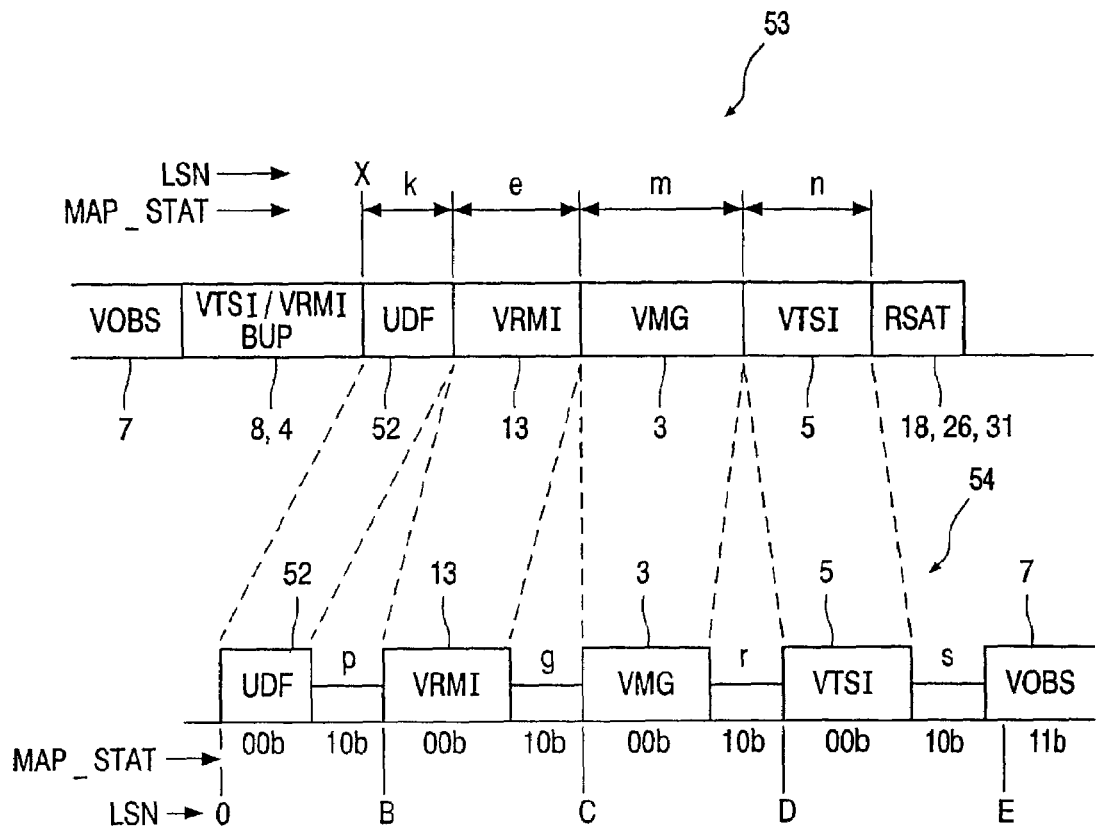
FIG. 7 a second example of use of a Reserved Allocation Table when making a second recording.

FIG. 7 shows a second example of possible use of a Reserved Space Allocation Table (RSAT) 18, 26, 31 in Video applications when making a second recording. The recording space 53 corresponds to the 'real' disc and the recording space 54 to the 'virtual' disc obtained by mapping the 'real' disc. This example differs from the example given in FIG. 6 in that the recorded area in the Temporary Overview Space (TOS) 17 is kept as small as possible by having the Management Data (MGT) 16 recorded mutually contiguously. Only when finalizing, the correct locations (A, B, C, C) are assigned with unused in between areas p, q, r and s within in the Reserved Space (RES) 19.

Figure 8:
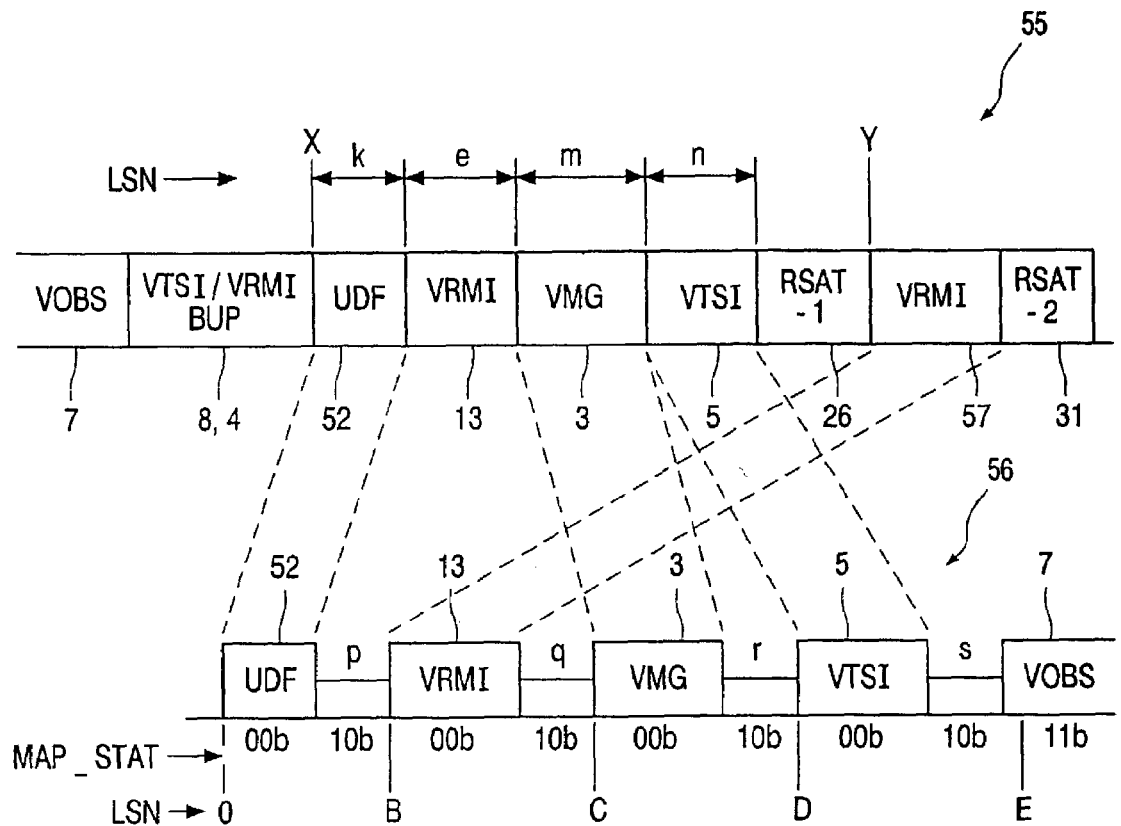
FIG. 8 a third example of use of a Reserved Allocation Table when making an update of management information.

FIG. 8 shows a third example of possible use of a Reserved Space Allocaton Table (RSAT) 18, 26, 31 when making an update of the Video Recorder Management Information (VRMI) 13 only. The recording space of the 'real' disc denoted by 55 and of the corresponding 'virtual' disc by 56. Because of the update, the previous Reserved Space Allocation Table (RSAT-1) 26 is not used anymore and replaced by a next Reserved Space Allocation Table (RSAT-2) 31. The RSAT-2 comprises the old mapping contained in RSAT-1 except for the mapping of the old VRMI 26 which is replaced by a mapping for the updated VRMI 27.

Figure 9:
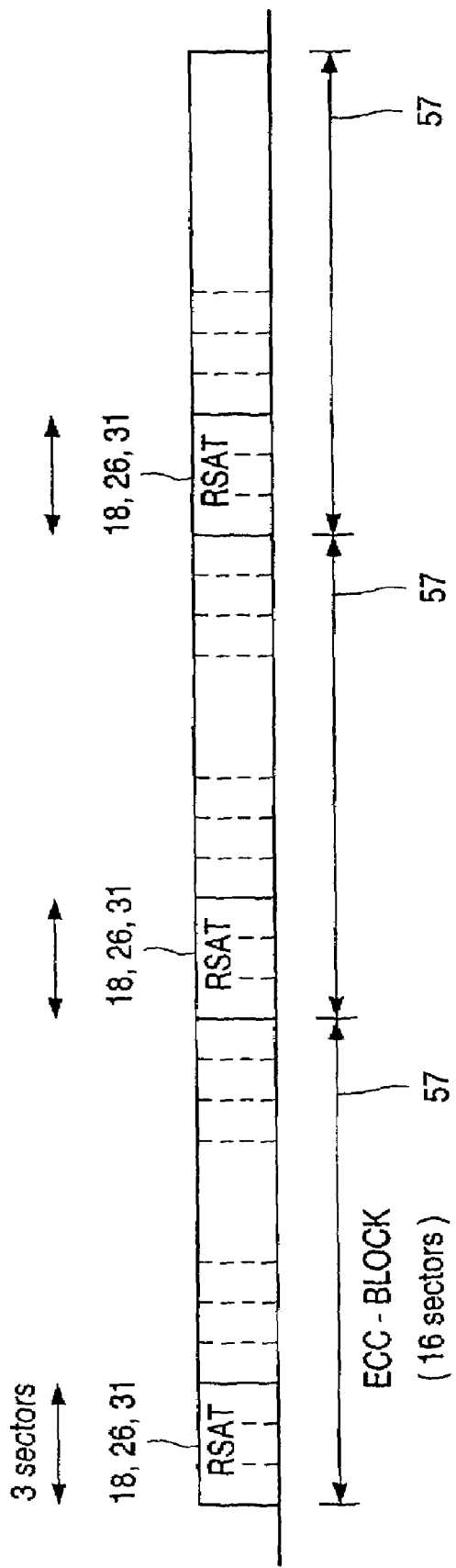
FIG. 9 an embodiment of allocation of the Reserved Allocation Table.

FIG. 9 shows an embodiment of allocation of the Reserved Space Allocation Tables (RSAT) 18, 26, 31. In this embodiment the area reserved for RSAT 18,26,31 consists of the last 2 or 3 recorded ECC blocks 57 of the Reserved Space 19, each containing a RSAT 18, 26, 31. Each occurrence being identical and located before the first byte of the first sector of each ECC block 57. All bytes not belonging to a RSAT 18, 26, 31 are reserved and are set to an arbitrary value.

Figure 10:
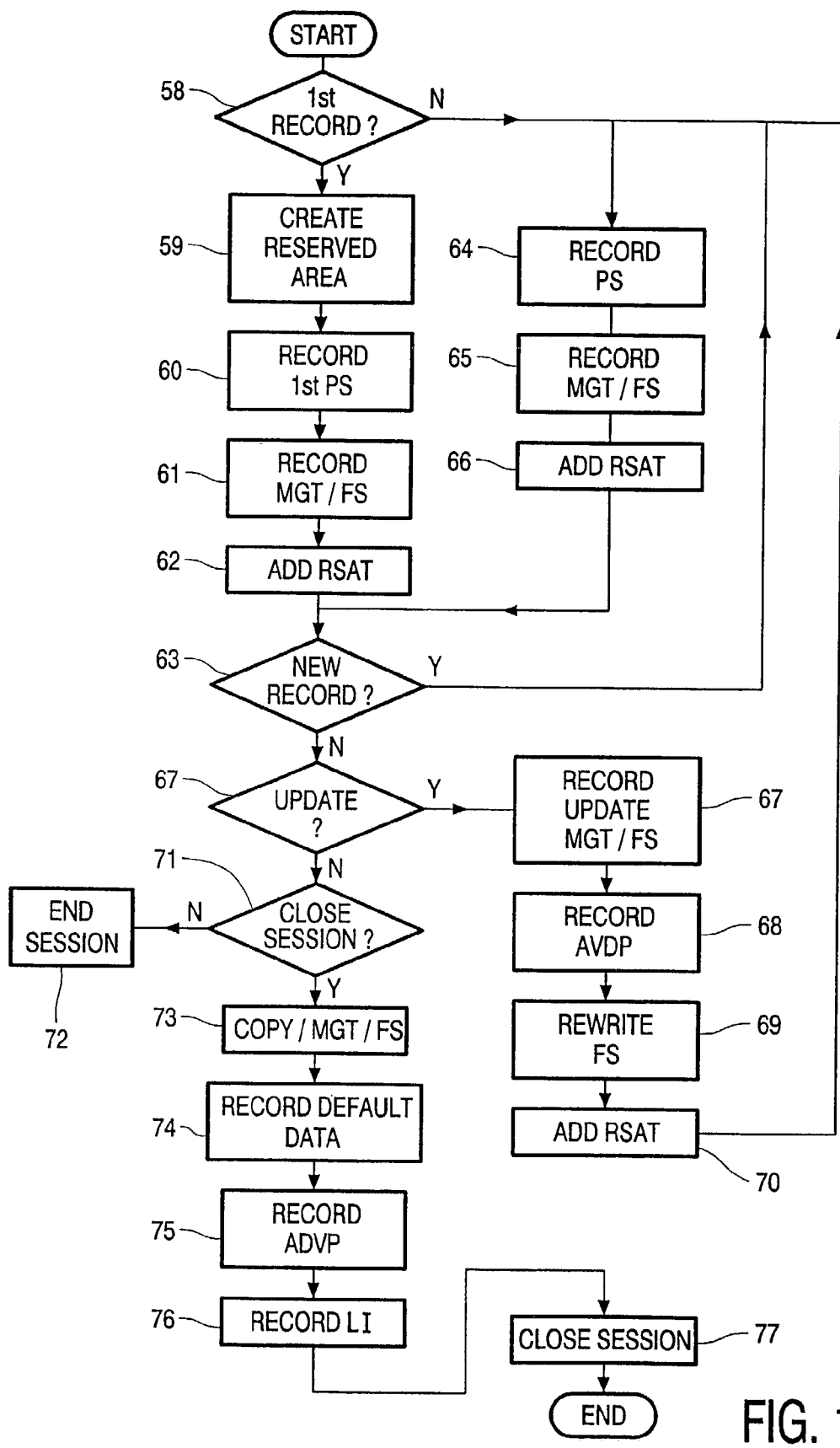
FIG. 10 a method of recording using a Reserved Allocation Table according to an embodiment of the invention.

FIG. 10 shows a method of recording according to an embodiment of the invention, using a Reserved Allocation Table (RSAT). The method may be executed by a general processor executing a loaded application program. Such as for instance in case of stand alone disc drive coupled to a computer system. The method may also be executed by dedicated processing hardware. Such as for instance in case of a built-in disc drive in a recording apparatus. Also part of the functionality may be built in the drive itself.

In a first step 58 it is determined whether a first recording is to be made on a blank disc of the recordable-type only. If this is the case, a drive is requested in step 59 to create a Reserved Space (RES) 19 at Physical Sector Number PSN=0003 0000h up to PSN=0003 3FF0h. In step 60 an audio/video information signal such as an MPEG-2 Program Stream with the audio-visual content for the first recording is written starting from address PSN=0003 4000h. Recording stop at a 16-sector boundary (in view of an ECC block of 16 sectors). The recorded stream complies with the Video Object Set for a Title (VTSTT_VOBS) specifications as defined in the DVD Video Data structure 12 for a DVD disc of the rewritable type as explained with reference to FIG. 2.

In step 61 all Management Data (MGT) 16 as required by the above-mentioned specifications are recorded following the recorded audio/video signal. Backup files for Video Title Set Information (VTSI_BUP) 5, Video Recorder Management Information (VRMI_BUP) 14 and the Second Anchor Volume Descriptor 34 are recorded in this order contiguously.

Finally, in step 62 an area for a Reserved Space Allocation Table (RSAT 18, 26, 31) is appended of, for instance 32 of 48 sectors, including 2 or 3 instances of a Reserved Space Allocation Table (RSAT) (18,26,31) with the version number set to 0.

FIG. 3A illustrates the result after such a first recording.

If, either in step 58 or step 63 is has been determined that a second or higher recording has to be made, then in step 64 an second audio/video information stream such as an MPEG-2 Program Stream is written starting from the last written address after step 62. The area starting at Physical Sector Number PSN=000 3 4000h until the end of the second recording complies with the above-mentioned VTSTT_VOBS specifications. The previously written Management Data (MGT1) 16 and Reserved Space Allocation Table (RSAT-1) 18 are fully absorbed by the new VTSTT_VOBS (27).

Again, in step 65, all new Management Data (MGT2) 25 is recorded following the second recording contained in a new Video Object Set for a Title (VTSTT-VOBS#2) 27.

In step 66 a new Reserved Space Allocation Table (RSAT2) 26 is added, similar to step 62 with the version number increased to 1. The result is illustrated in FIG. 3B.

In step 67 it is determined if only an update of the Management Data (MGT) 16 has to be recorded. Is so, then in step 68 a new version of the VRMI 13, the backup VRMI-BUP 14 and if necessary, VMG 3 files is recorded.

In step 68 a new second ADVP 34 is recorded after, at least, the VRMI-BUP 14. Both are not mapped by the corresponding RSAT. If necessary, part of the file system data is rewritten in step 69. Finally, in step 70, an additional RSAT-3 31 is added with the version number increased to 3. The result is shown in FIG. 3D.

If no update or recording is required, it has to be determined in step 71 if the present recording session should be closed of left open (step 72). If the session is left open, the disc shall contain a Reserved Space (RES) 19 and a Temporary Overview Space (TOS) 17.

If the session should be closed, the Management Data (MGT) 16, 25, 30 is copied from the Temporary Overview Space (TOS) 17, 24, 29 to the Reserved Space (RES) 19 in accordance with the mapping information contained in the Reserved Space Allocation Tables (RSAT) 18, 26, 31 in step 73. Next, in step 74, arbitrary data is recorded to all sectors in the Reserved Space (RES) 19 that all still unrecorded after the previous recording step.

In step 75, the final second Anchor Volume Descriptor (ADVP) 34 is added to end of the data structures. In step 76, the Lead-In area (LI) 20 is recorded according to the requirements for this area. Finally, in step 77, the session is closed by recording appropriate closure data. In that case no more video content according to the specified DVD Video Data Structures for a disc of the Write Once type can be recorded., although it is still possible to add other data.

Alternatively, the disc could be finalized by recording a Lead-Out area (21) instead of the above-mentioned closure data. In that case also no other data can be recorded.

Compatibility with the DVD Video Data Structures for a DVD disc of the Read-Only type is only obtained when the disc has a Lead-In (LI) 20, all sessions have been closed and there are no blank areas between the start of the Lead-In (LI) 20 and the end of last closure or Lead-Out area (LO) 21.

Figure 11:
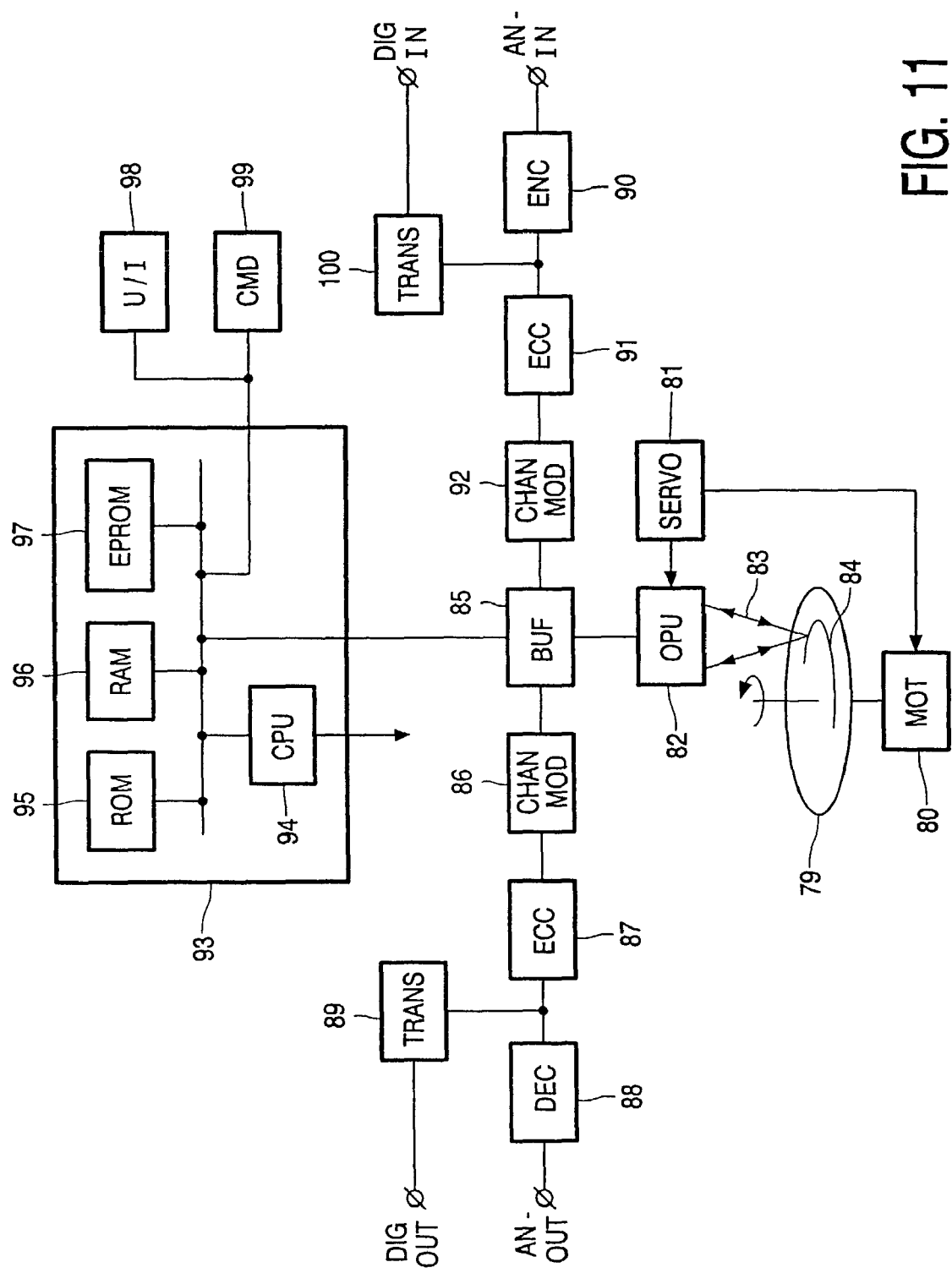
FIG. 11 a recording device according to the invention.

FIG. 11 shows a recording device according to an embodiment of the invention. A recordable disc of the DVD write-once type 79 is rotated by rotational drive means 80 controlled by servo motor control means 81. These servo motor control means 81 further control the positioning of an optical reading/recording unit 82 for scanning the disc 79 with a focused reading/recording laser beam 83 along a track 84.

This unit 82 comprises laser beam generating means as well as radiation sensitive detectors to convert reflected radiation into electrical signals. The digital data represented by these electrical signals are stored in buffer memory means 85. Channel demodulation means 86 and error-correction means 87 demodulate, respectively error-correct the channel coded information for obtaining the user data. The user data, which in case of video data is compressed according to a suitable compression format such as for instance the MPEG2-format. The compressed user data is decompressed with decoding means 88 (eg a MPEG-2 decoder) and converted into analogue signals by AD converter means. The user data may alternatively be outputted digital and compressed by using suitable transcoding means 89.

Reversibly, received analogue signals are converted into digital signal via DA converter means and subsequently MPEG-2 compressed by suitable encoding means 90, provided with error correction data by error correcting means 91 and channel encoded by channel modulation means 92. Also a digital compressed signals may be inputted via second transcoding means 100.

The channel modulation in case of DVD discs is of the EFM+ type.

A control unit 93 may control each unit as such as well as the cooperation between these units by control signals nor further shown in the figure. To this purpose the control unit comprises general processor means 94 connected with electronic memory means of the Read-Only type (ROM) 95, the Random-Access type (RAM) 96 and/or the erasable programmable type (EPROM) 97. The processor means 94 operates according to a loaded computer control program, stored in the above mentioned memory means 95-97 to perform the above-mentioned method. To receive control instructions the control unit 93 is connected to user interface means 98 and user command means 99.

The recording device shown with reference to FIG. 11 may either be a standalone recording device or may be a combination of a disc recording drive connected to general computer means provided with a program to perform the claimed method.

Although invention has been described with reference to preferred embodiments thereof, it is to be understood that these are not limitative examples. Thus various modifications thereof may become apparent to those skilled in the art, without departing from the scope of the invention, as defined by the claims. For instance, although the invention is described with reference to an optically readable DVD disc of the Recordable type, other types of recordable discs may be used. The invention may be implemented by means of both hardware and software, and that several 'means' may be represented by the same item of hardware.

Further, the invention lies in each and every novel feature of combination of features. It is also remarked that the word 'comprising' does not exclude the presence of other elements or steps then listed in the claims. Any reference signs do no limit the scope of the claims.

The invention claimed is:

1. A method of contiguously recording a sequence of ordered A/V information signals, such as video/audio information, and corresponding management information signals, such as video management, menu information or file information, on a disc-like recording medium of the write-once type, such as an optically recordable and readable disc, the recorded information complying to the requirements of ordering of such information as defined by a disc of the read-only type or of the rewritable type, characterized in that the method comprises the steps of:
    allocating a reserved area within a linear addressing space;
    contiguously recording the A/V information signals in a video recording area located succeeding the reserved area;
    recording corresponding management data in a temporary overview space succeeding the video recording area;
    generating a mapping table for mapping the recorded management data to address locations in the reserved area; and
    recording the mapping table in the temporary overview space.

2. The method as claimed in claim 1, characterized in that said method further comprises:
    contiguously recording a next sequence of A/V information signals on a next video recording area succeeding the previously recorded areas;
    recording next corresponding management data in the next temporary overview space succeeding the next video recording area;
    generating a mapping table for mapping the first and the next recorded management data to address locations in the reserved area; and
    recording the mapping table in the next temporary overview space.

3. The method as claimed in claim 1, characterized in that said method comprises the step of: generating updated corresponding management information signals by:
    recording at least the updated management information signals in a next temporary overview area succeeding the previous temporary overview area;
    generating an updated mapping table for mapping the updated management data and the remaining management data to address locations in the reserved area; and
    recording the updated mapping table in the next temporary overview space.

4. The method as claimed in claim 1, characterized in that the method further comprises the steps of:
    copying the recorded management information signals to the reserved area in correspondence to the latest mapping table information;
    recording the remaining unrecorded sections of the reserved area with arbitrary data signals;
    recording a lead-in area preceding the reserved area with data according to the definitions of a disc of the read-only type or of the rewritable type;
    recording a lead-out area succeeding the recorded area with data according to the definitions of a disc of the read-only type or of the rewritable type or with closure data for closing an actual video recording session.

5. The method as claimed in claim 4, characterized in that the method further comprises the step of:
    recording a mapping table containing a list of mapping items containing a recorded address location and a corresponding target address location in the reserved area.

6. The method as claimed in claim 4, characterized in that the method further comprises the step of:
    recording a mapping table containing a list of mapping locations containing to all corresponding target address locations in the reserved area.

7. The method as claimed in claim 4, characterized in that the method further comprises the step of:
    recording a version number to each recorded mapping table.

8. The method as claimed in claim 4, characterized in that the method further comprises the step of:
    recording the address location of the previously recorded mapping table to the mapping table.

9. The method as claimed in claim 4, characterized in that the method further comprises the step of:
    recording a mapping status to each item indicating the item to be mapped or not.

10. The method as claimed in claim 4, characterized in that the method further comprises the steps of:
    recording back-up versions of the management data in the temporary overview space; and
    generating a mapping table including back-up versions of the management data having a mapping status indicated that the back-up version are not mapped.

11. The method as claimed in claim 4, characterized in that the method further comprises the steps of:
    recording the location of a backup of a file system in the mapping table.

12. A recording device for contiguously recording a sequence of ordered A/V information signals, such as video/audio information, and corresponding management information signals, such as video management, menu information or file information, the recorded information complying to the requirements of ordering of such information as defined by a disc of the read-only type or of the rewritable type, the recording device comprising:
    means for carrying and rotating a disc-like recording medium of the write-once type;
    means for scanning a focused laser beam across a track of the disc-like recording medium;
    means for modulating the laser beam in accordance with digital information signals to be recorded on the disc-like recording medium;
    means for detecting reflections of the laser beam scanning the disc-like recording medium and converting the reflection in digital information signals to be read;

means for modulating received digital A/V information signals to information signals to be recorded; and control means for controlling the recording and reading of the digital information signals; characterized in that the control means is adapted to:

allocate a reserved area within a linear addressing space on the disc-like recording medium;

contiguously record the A/V information signals in a video recording area located succeeding the reserved area;

record corresponding management data in a temporary overview space succeeding the video recording area;

generate a mapping table for mapping the recorded management data to address locations in the reserved area; and record the mapping table in the temporary overview space.

13. The recording device as claimed in claim 12, characterized in that the control means is further adapted to:

contiguously record a next sequence of A/V information signals on a next video recording area succeeding the previously recorded areas;

record next corresponding management data in the next temporary overview space succeeding the next video recording area;

generate a mapping table for mapping the first and the next recorded management data to address locations in the reserved area; and record the mapping table in the next temporary overview space.

14. The recording device as claimed in claim 12, characterized in that the control means is further adapted to:

generate updated corresponding management information signals by:

recording at least the updated management information signals in a next temporary overview area succeeding the previous temporary overview area;

generating an updated mapping table for mapping the updated management data and the remaining management data to address locations in the reserved area; and recording the updated mapping table in the next temporary overview space.

15. The recording device as claimed in claim 12, characterized in that the control means is further adapted to:

copy the recorded management information signals to the reserved area in correspondence to the latest mapping table information;

record the remaining unrecorded sections of the reserved area with arbitrary data signals;

record a lead-in area preceding the reserved area with data according to the definitions of a disc of the read-only type or of the rewritable type; and record a lead-out area succeeding the recorded area with data according to the definitions of a disc of the read-only type or of the rewritable type or with closure data for closing an actual video recording session.

16. The recording device as claimed in claim 15, characterized in that the control means is further adapted to:

record a mapping table containing a list of mapping items containing a recorded address location and a corresponding target address location in the reserved area.

17. The recording device as claimed in claim 15, characterized in that the control means is further adapted to:

record a mapping table containing a list of mapping locations containing to all corresponding target address locations in the reserved area.

18. The recording device as claimed in claim 15, characterized in that the control means is further adapted to:

record a version number to each recorded mapping table.

19. The recording device as claimed in claim 15, characterized in that the control means is further adapted to:

record the address location of the previously recorded mapping table to the mapping table.

20. The recording device as claimed in claim 15, characterized in that the control means is further adapted to:

record a mapping status to each mapping item in the mapping table, the mapping status indicating the item to be mapped or not.

21. The recording device as claimed in claim 15, characterized in that the control means is further adapted to:

record back-up versions of the management data in the temporary overview space; and generate a mapping table including back-up versions of the management data having a mapping status indicated that the back-up version are not mapped.

22. The recording device as claimed in claim 15, characterized in that the control means is further adapted to:

record the location of a backup of a file system in the mapping table.

* * * * *